(12) United States Patent
Kim et al.

(10) Patent No.: US 12,254,291 B2
(45) Date of Patent: Mar. 18, 2025

(54) METHOD FOR A DEVELOPMENT ENVIRONMENT

(71) Applicant: Makina Rocks Co., Ltd., Seoul (KR)

(72) Inventors: Dae Sung Kim, Guri-si (KR); Hooncheol Shin, Seoul (KR); Hwiyeon Cho, Seoul (KR); Sangwoo Shim, Sokcho-si (KR); Byoungwan Kim, Seoul (KR)

(73) Assignee: MakinaRocks Co., LTD, Seoul (KR)

( * ) Notice: Subject to any disclaimer, the term of this patent is extended or adjusted under 35 U.S.C. 154(b) by 0 days.

(21) Appl. No.: 18/114,908

(22) Filed: Feb. 27, 2023

(65) Prior Publication Data

US 2023/0289146 A1   Sep. 14, 2023

(30) Foreign Application Priority Data

Mar. 8, 2022 (KR) ........................ 10-2022-0029643

(51) Int. Cl.
*G06F 8/34* (2018.01)
(52) U.S. Cl.
CPC ...................................... *G06F 8/34* (2013.01)
(58) Field of Classification Search
CPC ......................................................... G06F 8/34
See application file for complete search history.

(56) References Cited

U.S. PATENT DOCUMENTS

| 2015/0212687 | A1 | 7/2015 | Nam et al. |
| 2020/0097793 | A1 | 3/2020 | Chen et al. |
| 2022/0138004 | A1* | 5/2022 | Nandakumar ......... G06N 20/00 718/102 |
| 2022/0300850 | A1* | 9/2022 | Mendez ................. G06N 20/00 |

FOREIGN PATENT DOCUMENTS

| KR | 10-0642476 | 10/2006 |
| KR | 10-2012-0005358 | 1/2012 |
| KR | 10-2015-0090364 | 8/2015 |
| KR | 10-2018-0097224 | 8/2018 |
| KR | 10-2019-0139837 | 12/2019 |
| KR | 10-2140730 | 7/2020 |
| KR | 10-2213815 | 2/2021 |
| KR | 10-2300005 | 9/2021 |

OTHER PUBLICATIONS

Visual Scripting Bolt Bolt [Unity Asset A4] ; (https://www.youtube.com/watch?v=vs1oxSAEb10); See slides and watch the video using Google translate.

* cited by examiner

*Primary Examiner* — Duy Khuong T Nguyen
(74) *Attorney, Agent, or Firm* — Rutan and Tucker, LLP

(57) ABSTRACT

Disclosed is a method performed by a computing device for implementing a Graphical User Interface (GUI) providing a development environment, the method including: setting, by a computing device, a plurality of code blocks; designating two or more execution target blocks among the plurality of code blocks; constructing one or more pipelines defining a relationship between the two or more execution target blocks and connecting the two or more execution target blocks; and executing at least some of the two or more execution target blocks based on the connection relationship of the one or more pipelines.

12 Claims, 19 Drawing Sheets

Fig. 4

METHOD FOR A DEVELOPMENT ENVIRONMENT

CROSS-REFERENCE TO RELATED APPLICATIONS

This application claims priority under 35 U.S.C. 119 to and the benefit of Korean Patent Application No. 10-2022-0029643 filed in the Korean Intellectual Property Office on Mar. 8, 2022, the entire contents of which are incorporated herein by reference.

TECHNICAL FIELD

The present disclosure relates to a method of providing a development environment, and more particularly, to a method of supplementing work performed in an existing development environment and providing a user interface for the work.

BACKGROUND ART

In the field of computer science, a development environment is used as a set of tools to facilitate the development of software and hardware programs.

As a development environment that is widely used in recent years, instead of the existing Integrated Development Environment (IDE), which has various functions, but is slow and heavy, products, such as Jupyter Notebook or Jupyter Lab, which are development environments capable of executing in units of cells and with high speed, are in the spotlight.

However, these types of development environments are capable of partial execution in cell units, but maintain the properties of deriving results in sequence regardless of the relationship between cells, there is a problem that the entire process must be restarted to see the result when the contents of some code blocks are modified. In addition, since it is difficult to comprehensively recognize the structure through the correlation between code blocks, time and cost are consumed when the contents are explained to someone other than the code writer or collaborating is performed.

Please see Korean Patent Application No. 2021-0087426, filed Jul. 2, 2021, titled "Method and apparatus for providing platform-integrated SDK capable of developing multiple platforms with single source code" for an example prior technology.

SUMMARY OF THE INVENTION

The present disclosure has been conceived to overcome issues with the foregoing background art, and has been made in an effort to provide a method of supplementing work performed in an existing development environment, and a user interface performing the method.

In order to solve the foregoing object, an exemplary embodiment of the present disclosure discloses a method for implementing a Graphical User Interface (GUI) providing a development environment, the method including: setting a plurality of code blocks; designating two or more execution target blocks among the plurality of code blocks; constructing one or more pipelines defining a relationship between the two or more execution target blocks and connecting the two or more execution target blocks; and executing at least some of the two or more execution target blocks based on the connection relationship of the one or more pipelines.

In the alternative exemplary embodiment, the setting of the plurality of code blocks may include: searching for execution target blocks among the plurality of code blocks; and designating the execution target blocks from a result of the search.

In the alternative exemplary embodiment, the constructing of one or more pipelines defining the relationship between the two or more execution target blocks and connecting the two or more execution target blocks may include: searching for connection target blocks among the two or more execution target code blocks; selecting a pipeline defining a relationship between the connection target blocks; and combining the connection target blocks with the selected pipeline.

In the alternative exemplary embodiment, the executing of at least some of the two or more execution target blocks based on the connection relationship of the one or more pipelines may further include: reusing and executing execution data for at least some of the two or more execution target blocks when cache data is utilized in an execution process; and executing only at least some of the execution target blocks when the cache data is not utilized in the execution process.

In the alternative exemplary embodiment, the executing of at least some of the two or more execution target blocks based on the connection relationship of the one or more pipelines may include: selecting at least one block from among the two or more execution target blocks; and executing the at least one selected block and one or more execution target blocks connected to the at least one selected block in a dependency relationship together.

In the alternative exemplary embodiment, the cache data may be data in which some of the execution target blocks are executed and a result of the execution is stored in a cache form.

In the alternative exemplary embodiment, the method may further include exporting the two or more execution target blocks connected by the one or more pipelines into a form usable by another computer program.

In order to solve the foregoing object, another exemplary embodiment of the present disclosure discloses a computing device for implementing a Graphical User Interface (GUI) providing a development environment, the computing device including: a processor including one or more cores; and a memory, in which the processor is configured to perform operations for implementing a Graphical User Interface (GUI) providing a development environment, the operations including: setting a plurality of code blocks; designating two or more execution target blocks among the plurality of code blocks; constructing one or more pipelines defining a relationship between the two or more execution target blocks and connecting the two or more execution target blocks; and executing at least some of the two or more execution target blocks based on the connection relationship of the one or more pipelines.

In the alternative exemplary embodiment, the graphic user interface may include: a first area displaying schematic diagrams of the two or more execution target blocks connected by the one or more pipelines; a second area displaying the plurality of code blocks; a third area displaying properties of the two or more execution target blocks and the one or more pipelines; and a fourth area displaying a result of executing at least some of the execution target blocks.

In the alternative exemplary embodiment, the graphic user interface may include: an interface for receiving a first input for designating at least one execution target block from a search field; an interface for searching for and displaying the at least one execution target block in response to the first input; an interface for receiving a second input defining properties of the pipeline from the search field; and an interface for configuring the list of at least one execution target block into a pipeline and displaying the configuration in response to the first input and the second input.

In the alternative exemplary embodiment, the graphic user interface may further include: an interface for displaying whether a corresponding code block is included in the execution target block; and an interface for displaying contents of the corresponding code block.

In the alternative exemplary embodiment, the graphic user interface may further include: an interface for displaying whether the result of executing each block is stored in a cache form.

In the alternative exemplary embodiment, the graphic user interface may include: an interface for receiving a third input of a user for selecting at least one block to be executed from among the two or more execution target blocks; an interface for receiving a fourth input for selecting a block in which the cache data is stored when there is cache data to be used for calculating the at least one block to be executed; and an interface for displaying a result of calculating the at least one execution target block by using the cache data in response to the third input or the fourth input.

The present disclosure may supplement work performed in a development environment and provide a Graphical User Interface (GUI) for this.

BRIEF DESCRIPTION OF THE DRAWINGS

Figure 4:
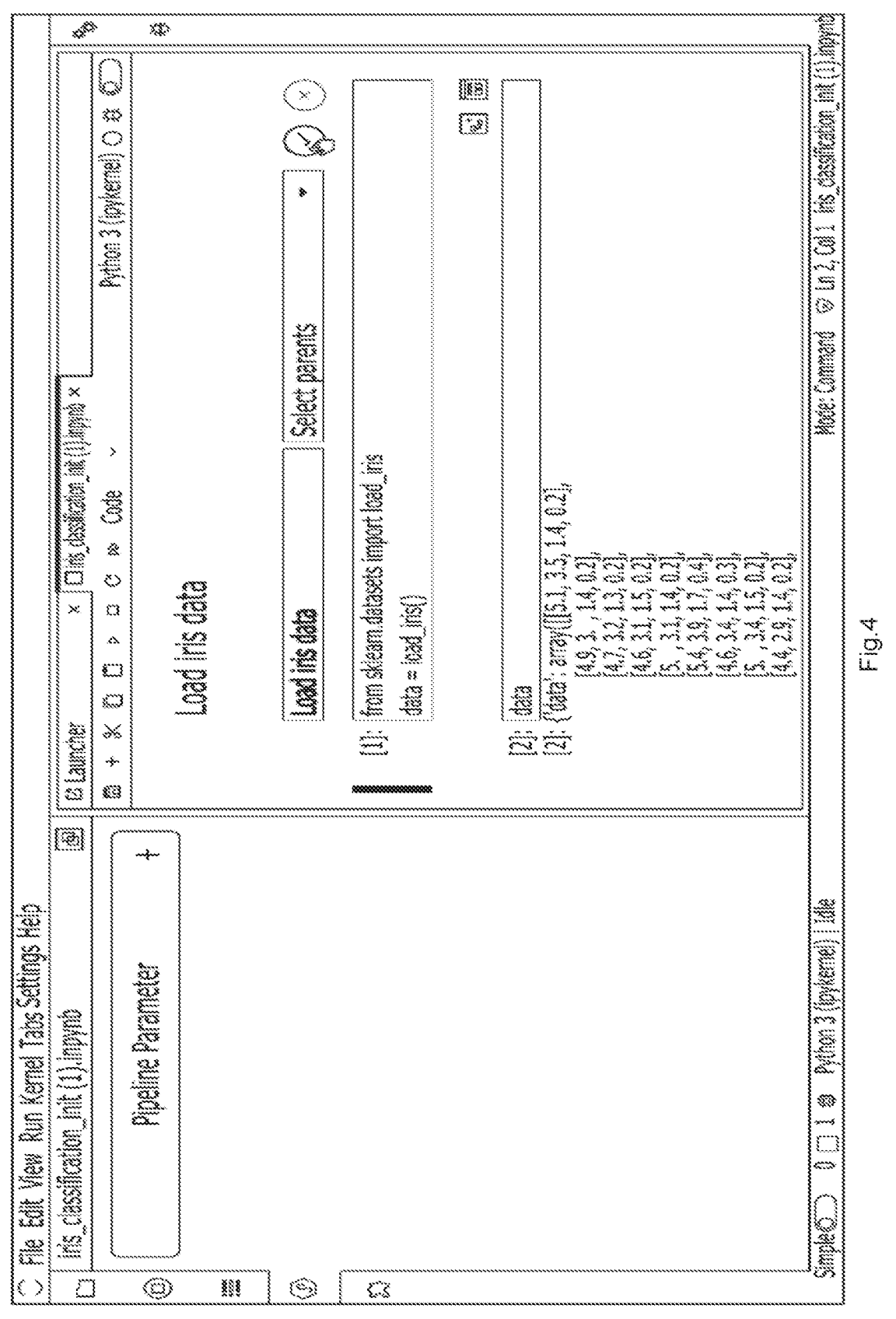

FIG. 4 is a conceptual diagram of an interface for adding a specific block among a plurality of code blocks to an execution target block according to the exemplary embodiment of the present disclosure.

DETAILED DESCRIPTION

Figure 1:
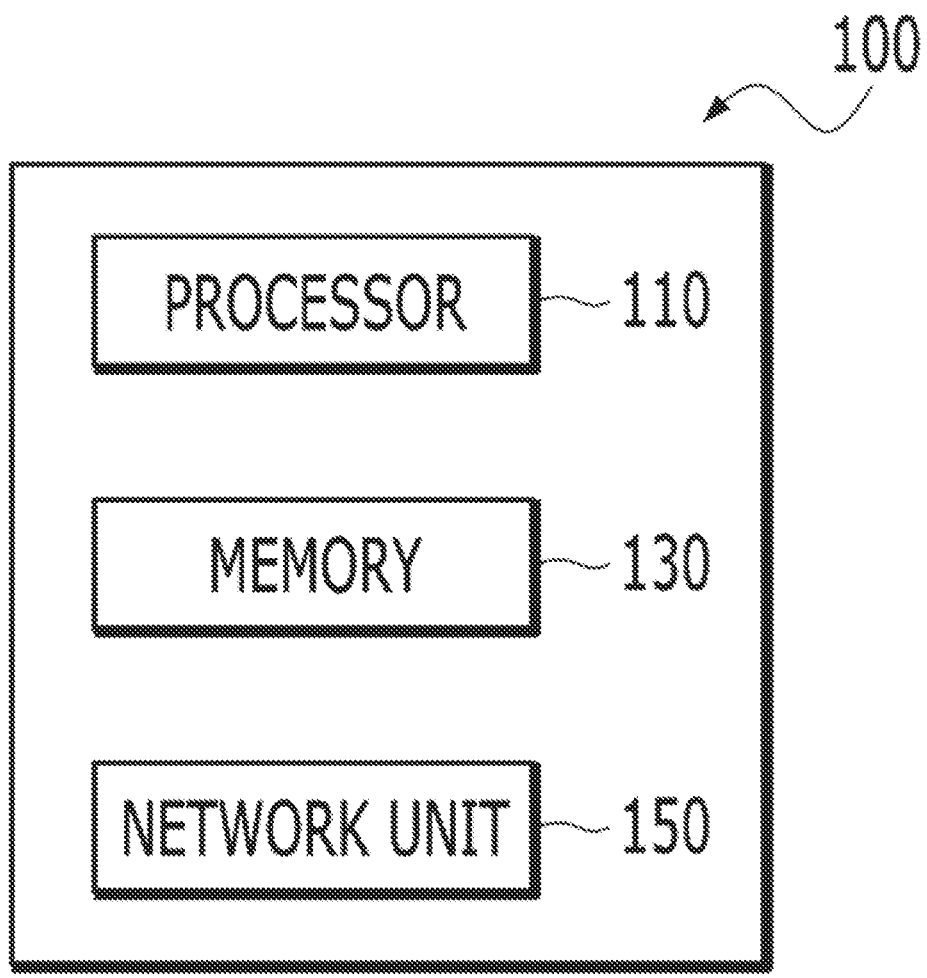
FIG. 1 is a block diagram of a computing device performing an operation for providing a development environment and a Graphical User Interface (GUI) according to an exemplary embodiment of the present disclosure.
Figure 2:
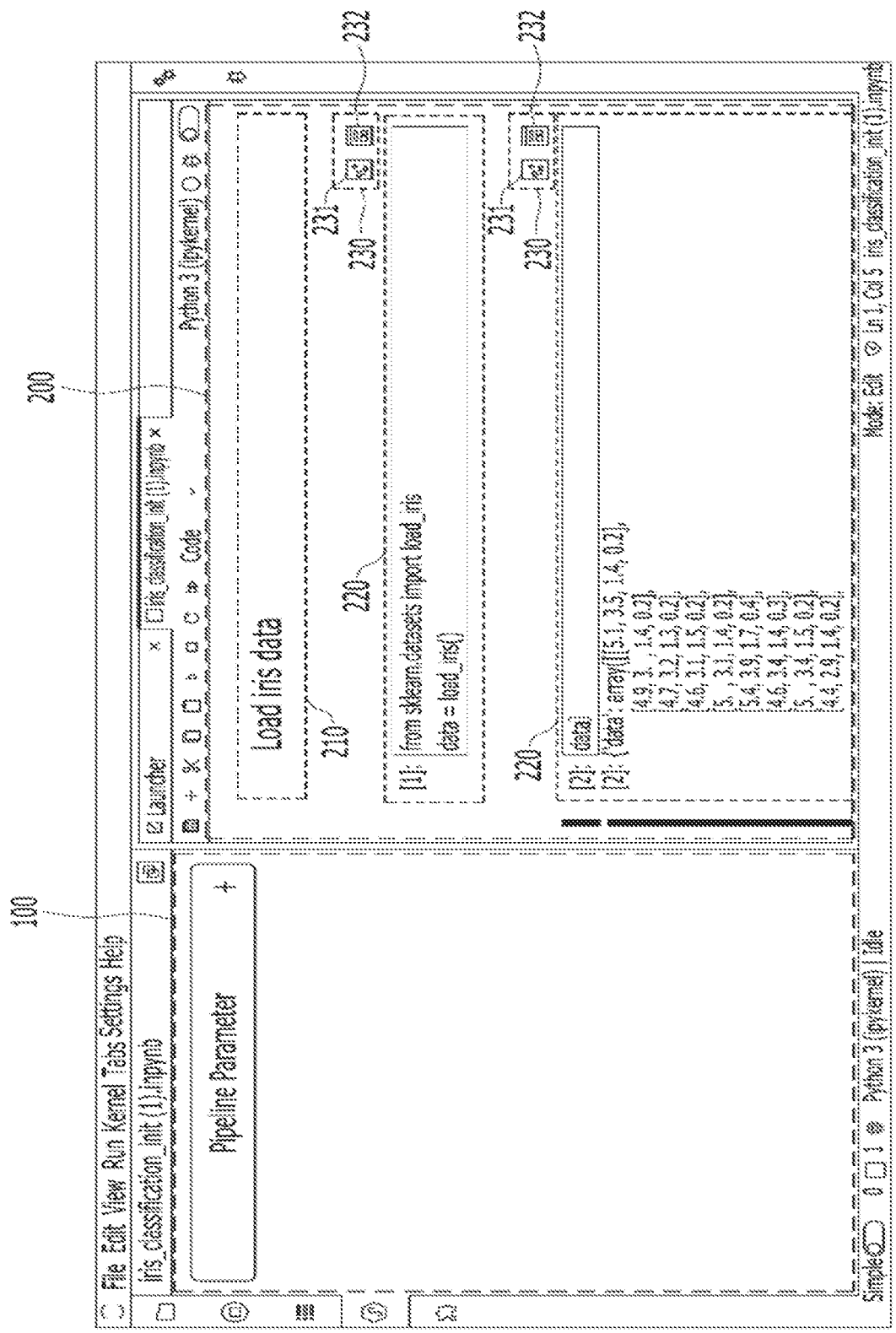
FIG. 2 is a conceptual diagram of an interface for providing a development environment according to the exemplary embodiment of the present disclosure.

The present disclosure may include various exemplary embodiments related to supplementing work performed in a development environment and providing an interface therefor. For example, the present disclosure may include various exemplary embodiments related to providing a development environment capable of reducing consumption of computer resources and time due to redundant execution and facilitating collaboration between different users.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions.

That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

FIG. 1 is a block diagram of a computing device performing an operation for providing a development environment and a Graphical User Interface (GUI) according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device.

In one exemplary embodiment of the present disclosure, the processor 110 may designate two or more execution target blocks from a plurality of code blocks, configure a pipeline connecting the two or more execution target blocks, and connect the two or more execution target blocks. In this case, the execution target block means a unit cell in a development environment, such as Jupyter Lab, but the indicated name may be different depending on the development environment.

The processor 110 may configure two or more execution target blocks connected to one or more pipelines. A pipeline refers to a structure in which the output of one data processing operation is connected to the input of the next step. Each module of the software is sequentially and automatically executed by a pipeline. The execution target block may interact with other execution target blocks connected through the pipeline with specific dependencies or relationships. Here, a detailed process of constructing two or more execution target blocks connected to one or more pipelines will be described below with reference to FIGS. 8 and 9.

The processor 110 may derive a result of executing at least some of the two or more connected execution target blocks in response to a user's input, and display the result.

The processor 110 may store some of the results in the form of cache data, and when executing another code block, the processor 110 may use the cache data to derive a result value without re-executing the entire execution target blocks. Here, a detailed process of utilizing cache data will be described below with reference to FIG. 11.

The processor 110 may export structures and result values of execution target blocks that have been completely executed in the form of cache data suitable for use in other computer programs. In addition, the processor 110 may call specific cache data in order to derive a result obtained by using externally generated cache data.

Here, a detailed description of the described processor 110 may be replaced with the contents described with reference to FIGS. 2 to 14E, and each operation may be omitted or added based on the above-described contents.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

The network unit 150 according to an exemplary embodiment of the present disclosure may use an arbitrary type known wired/wireless communication systems.

The techniques described herein may be used not only in the networks mentioned above, but also in other networks.

The method included in the present disclosure will be described with reference to the Graphical User Interface (GUI) of FIGS. 2 to 14E.

Figure 3:
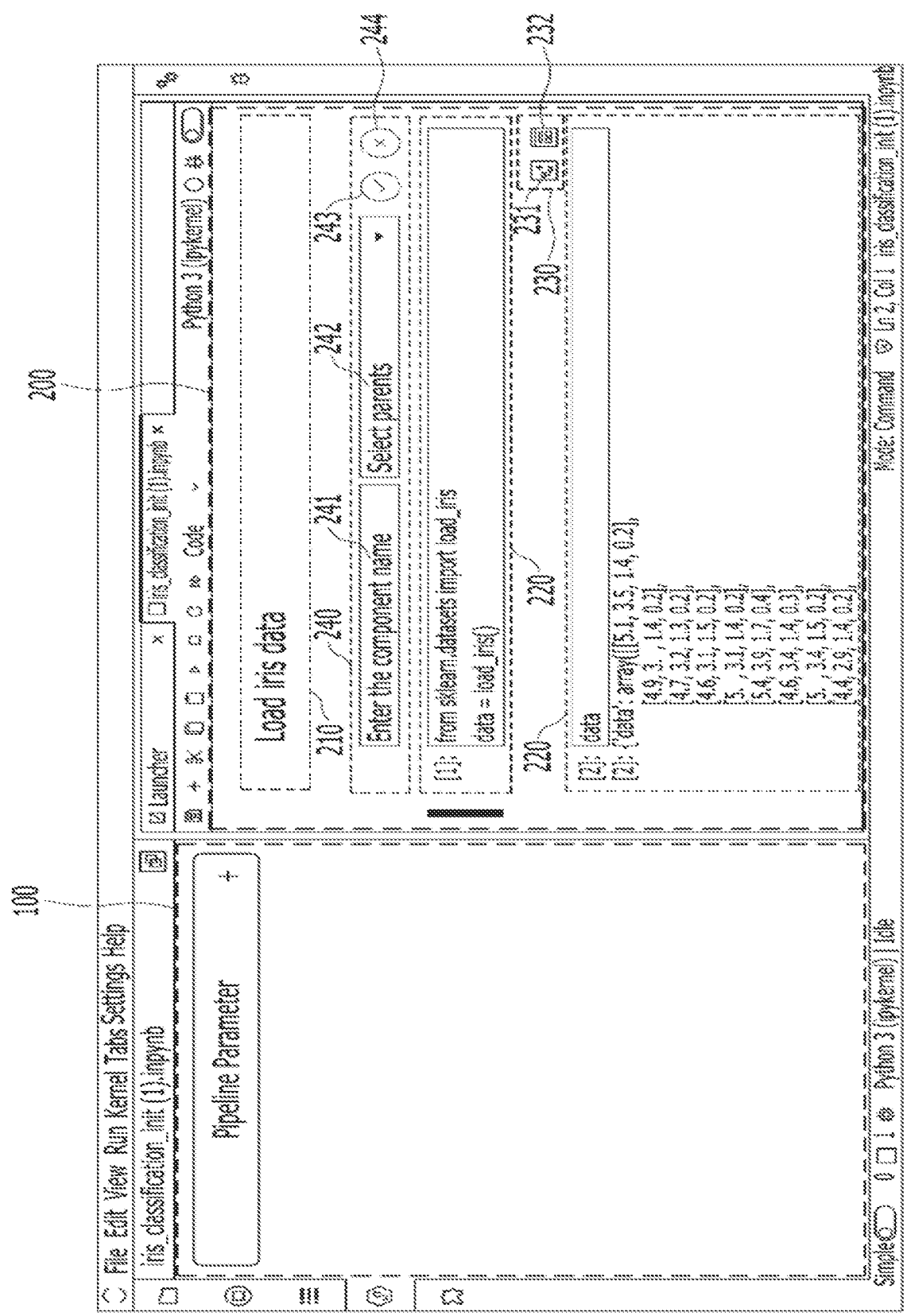
FIG. 3 is a conceptual diagram of an interface for searching an execution target block among a plurality of code blocks according to the exemplary embodiment of the present disclosure.

According to the exemplary embodiment of the present disclosure, a user may designate an 'execution target block', which is a code block to be potentially executed, among code blocks written in a development environment, such as Jupyter Lab. In addition, an operation of assigning a unique name to each of the code blocks according to a user's input may be included. Referring to FIG. 3, a user may call a menu 240 for adding an execution target block and a pipeline through the interface 230 in order to designate an execution target block from a plurality of code blocks. The user may directly input a name of the execution target block from a search field 241 that may be included in the menu 240 for adding the execution target block and the pipeline, or select a desired block from the list of execution targets displayed in the form of a list, but the present disclosure is not limited thereto.

Meanwhile, the present disclosure may include an operation of displaying a search field and receiving an input defining attributes of the pipeline from the search field. The newly added code block may be a block to be executed at a previous stage of the designated execution target block, a block to be executed at a subsequent stage, or a block to be executed at the same layer. For example, referring to FIG. 7, a 'load iris data' block 110' that is one of the execution target blocks, corresponds to a block executed in a previous stage to a newly added 'create dataframe' block 111.

Figure 8:
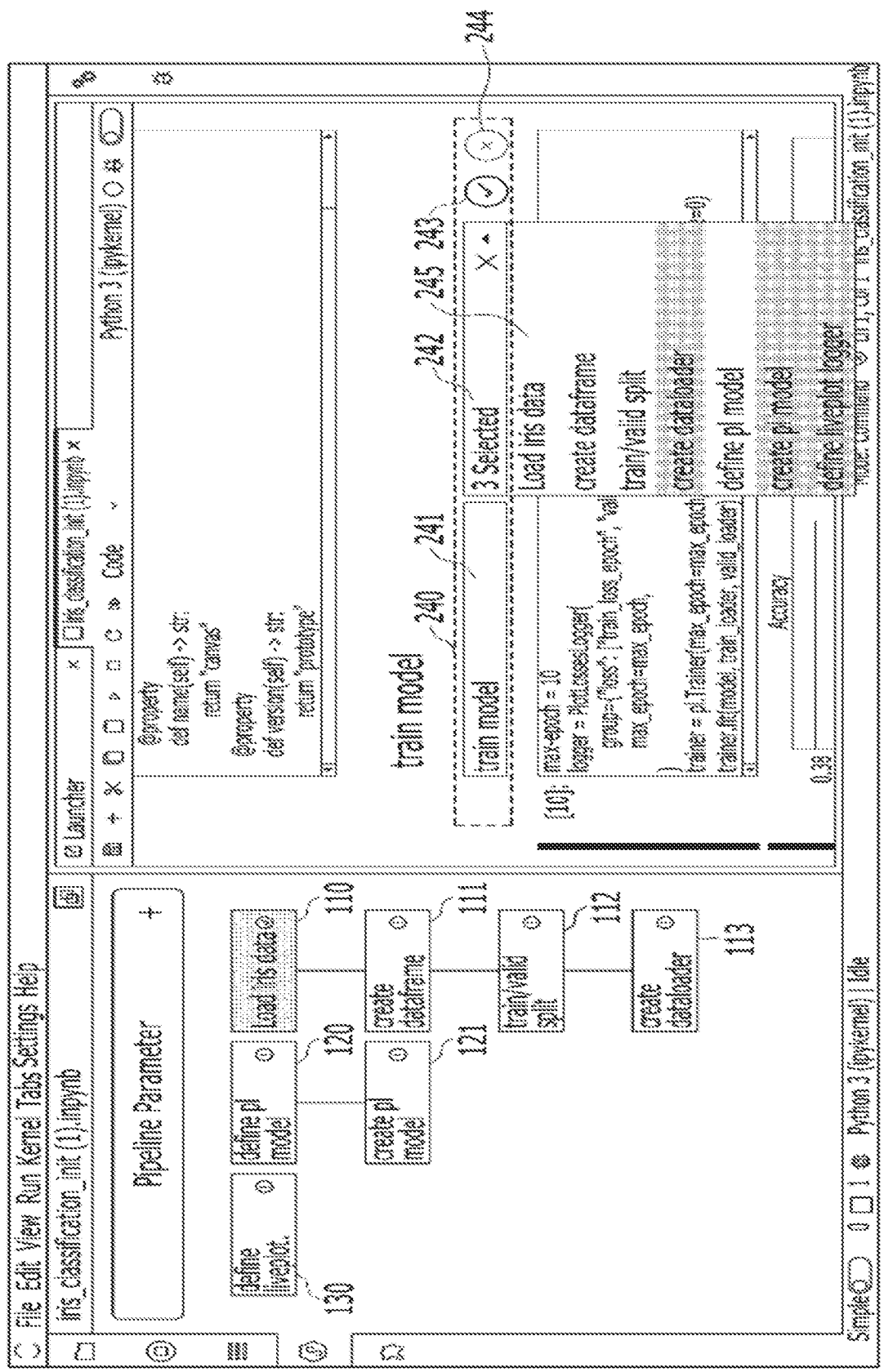
FIG. 8 is a conceptual diagram of an interface for defining dependencies of the execution target blocks according to the exemplary embodiment of the present disclosure.
Figure 9:
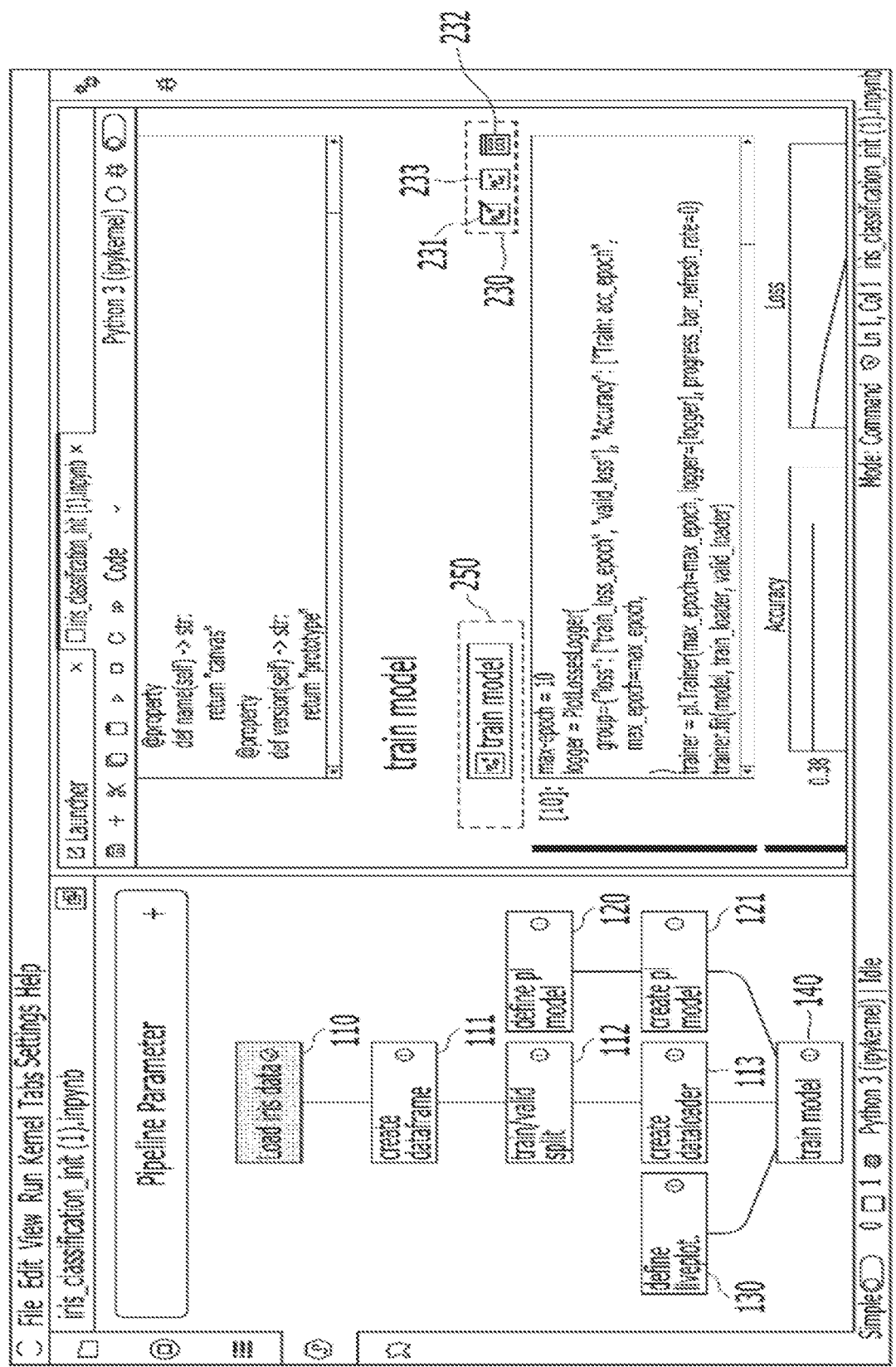
FIG. 9 is a conceptual diagram of an interface for displaying a relationship between execution target blocks according to the exemplary embodiment of the present disclosure.
Figure 10:
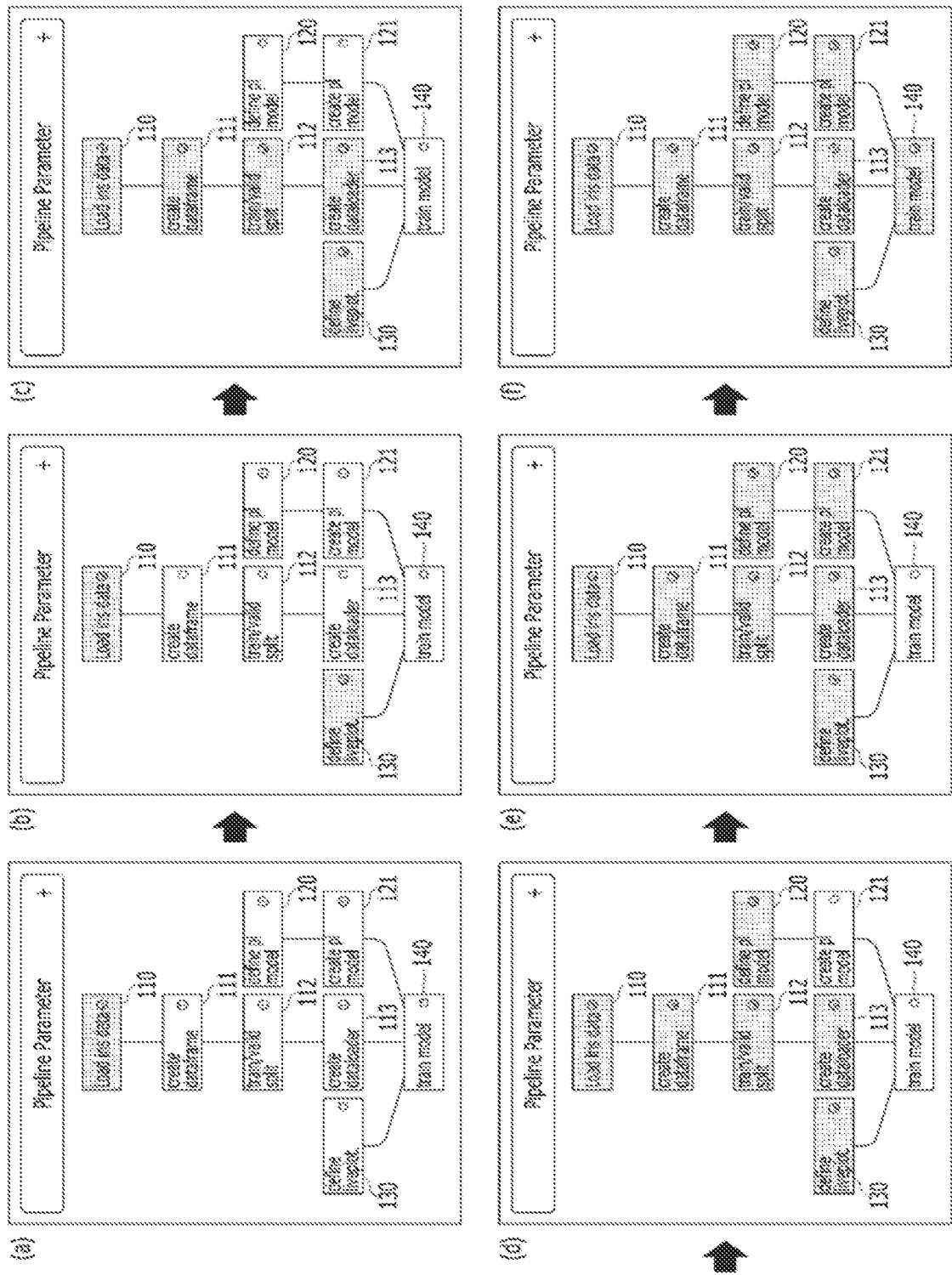
FIG. 10 is a conceptual diagram of an interface for displaying an execution order of execution target blocks and whether or not to execute the execution target block according to the exemplary embodiment of the present disclosure.

On the other hand, the user may also configure a block that is not connected by a pipeline and exists independently of the existing execution target block. Referring to FIG. 8, the 'load iris data' block 110 has a sequential relationship with the 'create dataframe' block 111, but a 'define Liveplot' block 130 is configured to be independent from the 'load iris data' block 110 and may not have a sequential relationship.

Meanwhile, a specific execution target block may have dependencies with two or more execution target blocks at the same time. For example, referring to FIG. 9, a 'train model' block 140, which is the execution target block, is simultaneously connected with the 'define Liveplot' block 130, a 'create dataloader' block 113, and a 'create pI model' block 121. When the execution target blocks are executed according to the sequential execution relationship, the order in which the execution target blocks, that is, the 'define Liveplot' block 130, the 'create dataloader' block 113, and the 'create pI model' block 121, directly connected with the execution target block, such as the "train model" block 140, simultaneously connected with multiple execution target blocks may be left to right, top to bottom, or the order specified by the user, but the present disclosure is not limited thereto.

Meanwhile, the present disclosure may include an operation of deriving a result value of the execution target block selected by the user's input. For example, referring to FIG. 9, when the user executes the 'load iris data' block 110, which is one of the execution target blocks, the processor 110 may execute only a code block of a portion designated as the name of 'load iris data' among the code blocks, rather than executing all of the plurality of code blocks.

The present disclosure may include an operation of, when several execution target blocks are simultaneously connected to one execution target block, executing all execution target blocks dependent on the one execution target block by an input for executing the one execution target block. For example, referring to FIG. 10, when the user executes the 'train model' block 140, all of the 'define Liveplot' block 130, the 'create dataloader' block 113, and the 'create pI model' block 121 connected with the 'train model' block 140 in according to the sequential relationship may be executed. In this case, in order to execute the 'create dataloader' block 113, other execution target blocks connected with the sequential relationship with the 'create dataloader' block 113 needs to be executed first. In addition, in order to execute the 'create pI model' block 121, other execution target blocks connected with the sequential relationship with the 'create pI model' block 121 needs to be executed first. As a result, all execution target blocks dependent on the 'train model' block 140 may be executed by the input for executing the 'train model' block 140.

According to the present disclosure, the processor 110 may include an operation of executing at least some of two or more execution target blocks and then storing a result of the execution in the memory 130 in the form of cache data.

A cache is a temporary place where data is copied in advance, and is used when it takes a long time to access original data or when it is desired to reduce the time consumed by recalculating result values.

Figure 11:
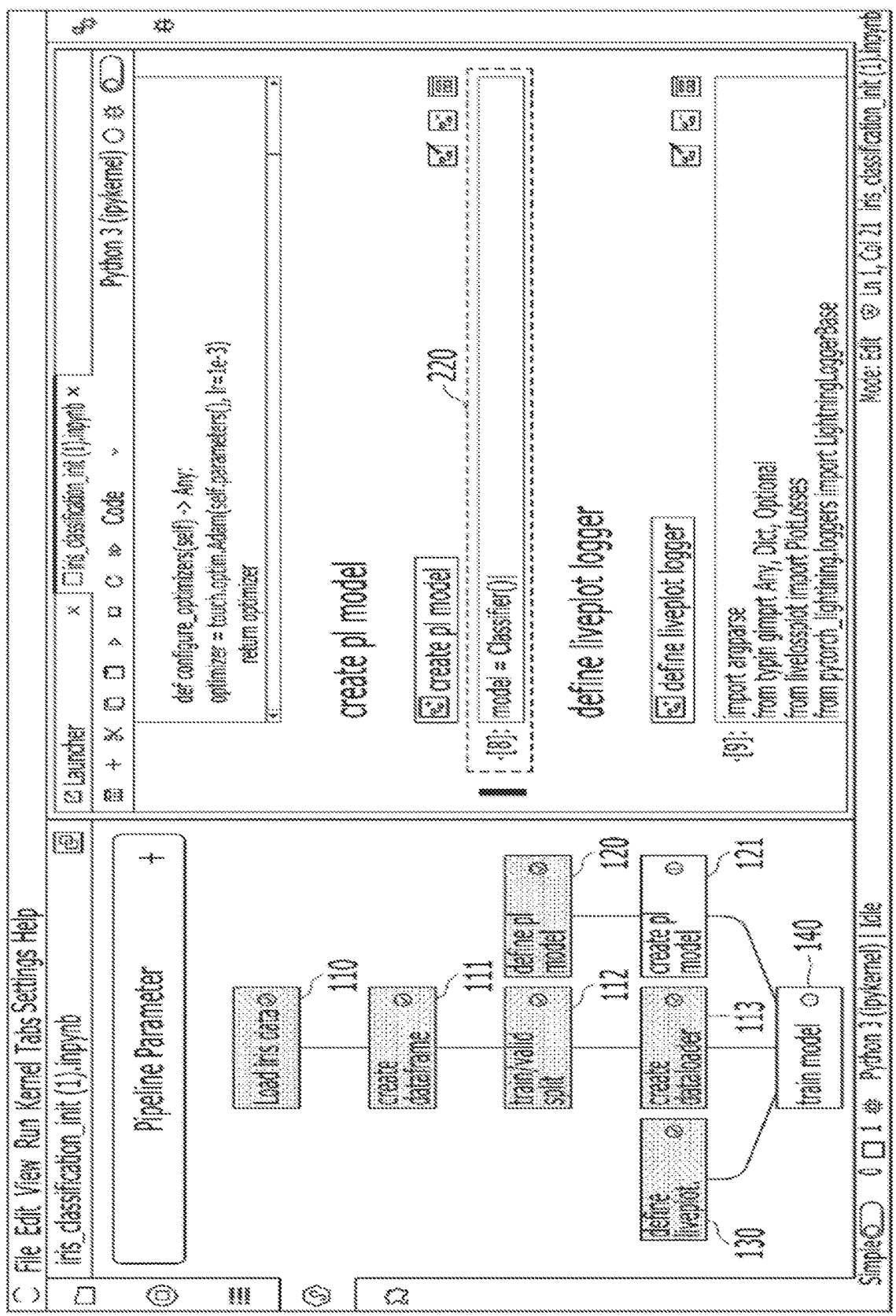
FIG. 11 is a conceptual diagram of an interface for displaying a code block that has been executed completely according to the exemplary embodiment of the present disclosure.
Figure 12:
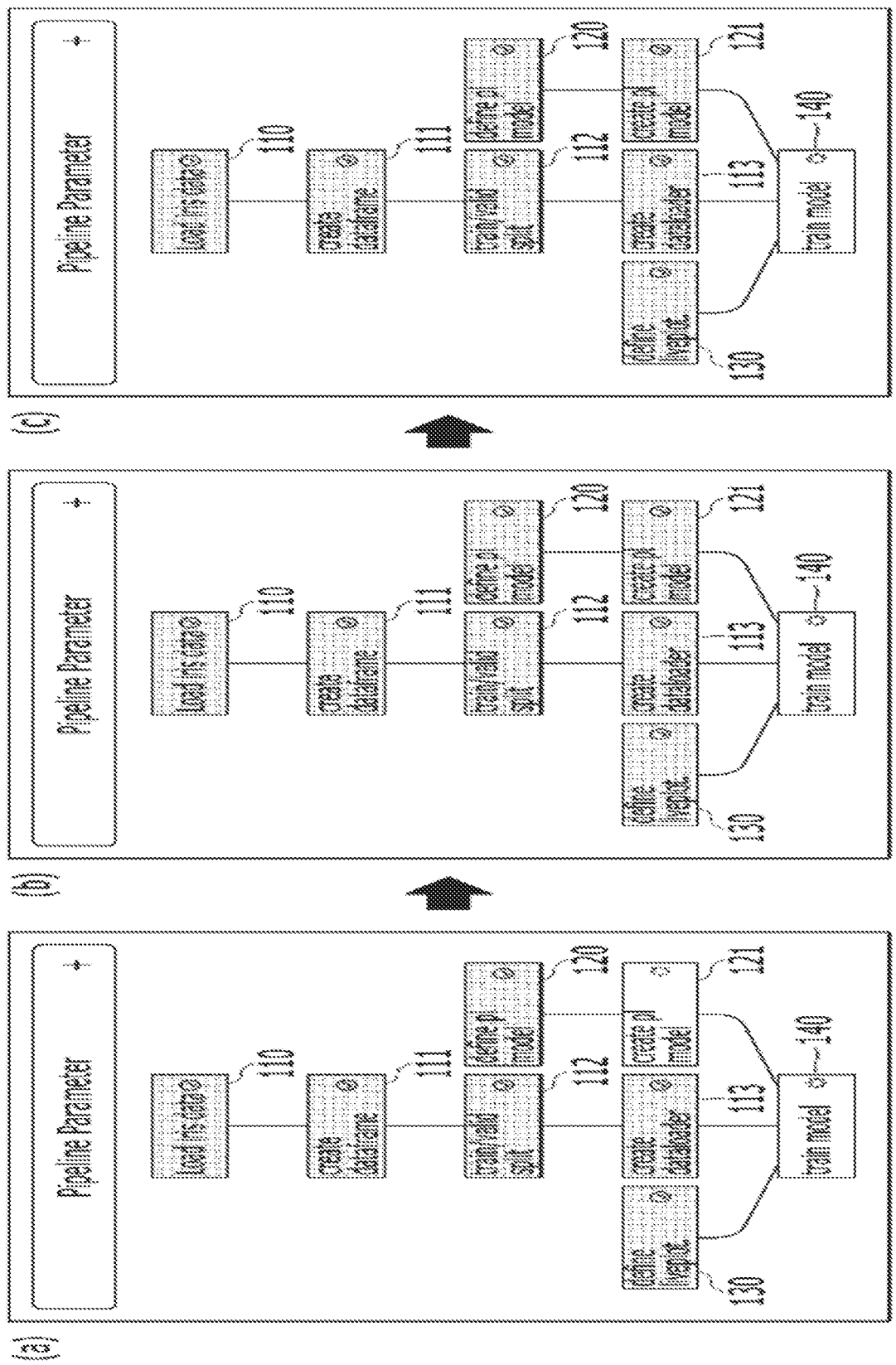
FIG. 12 is a conceptual diagram of an interface for displaying an execution order of at least a part of execution target block and whether or not to execute the execution target block when data stored in the form of cache data is used according to the exemplary embodiment of the present disclosure.
Figure 13:
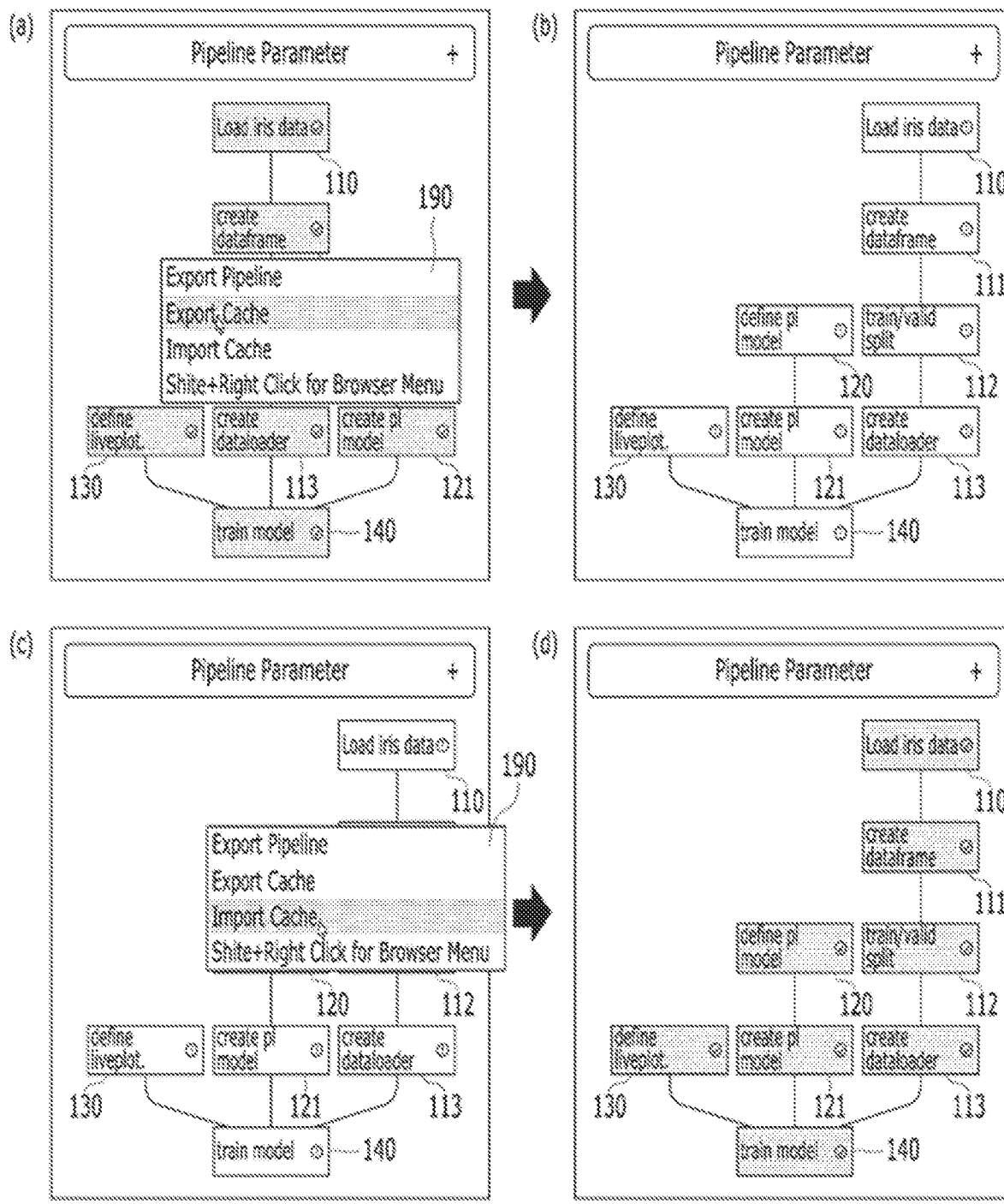
FIG. 13 is a conceptual diagram of an interface for exporting cache data of a code block or loading cache data from the outside according to the exemplary embodiment of the present disclosure.

For example, referring to FIG. 11, the 'define Liveplot' block 130, the 'load iris data' block 110, the 'create dataframe' block 111, the 'train/valid split' block 112, the 'create dataloader' block 113, and the 'define pI model' block 120 which are some of the two or more execution target blocks are already executed by the processor 110 and stored in the form of cache data. If the user wants to restart the entire execution target blocks by modifying the contents of the 'create pI model' block 121, not that the memory 130 is initialized and the entire execution target blocks are re-executed, but a final result may be derived by utilizing cache data of the execution target blocks whose results are not changed by the change of the 'create pI model' block 121.

Figure 14A:
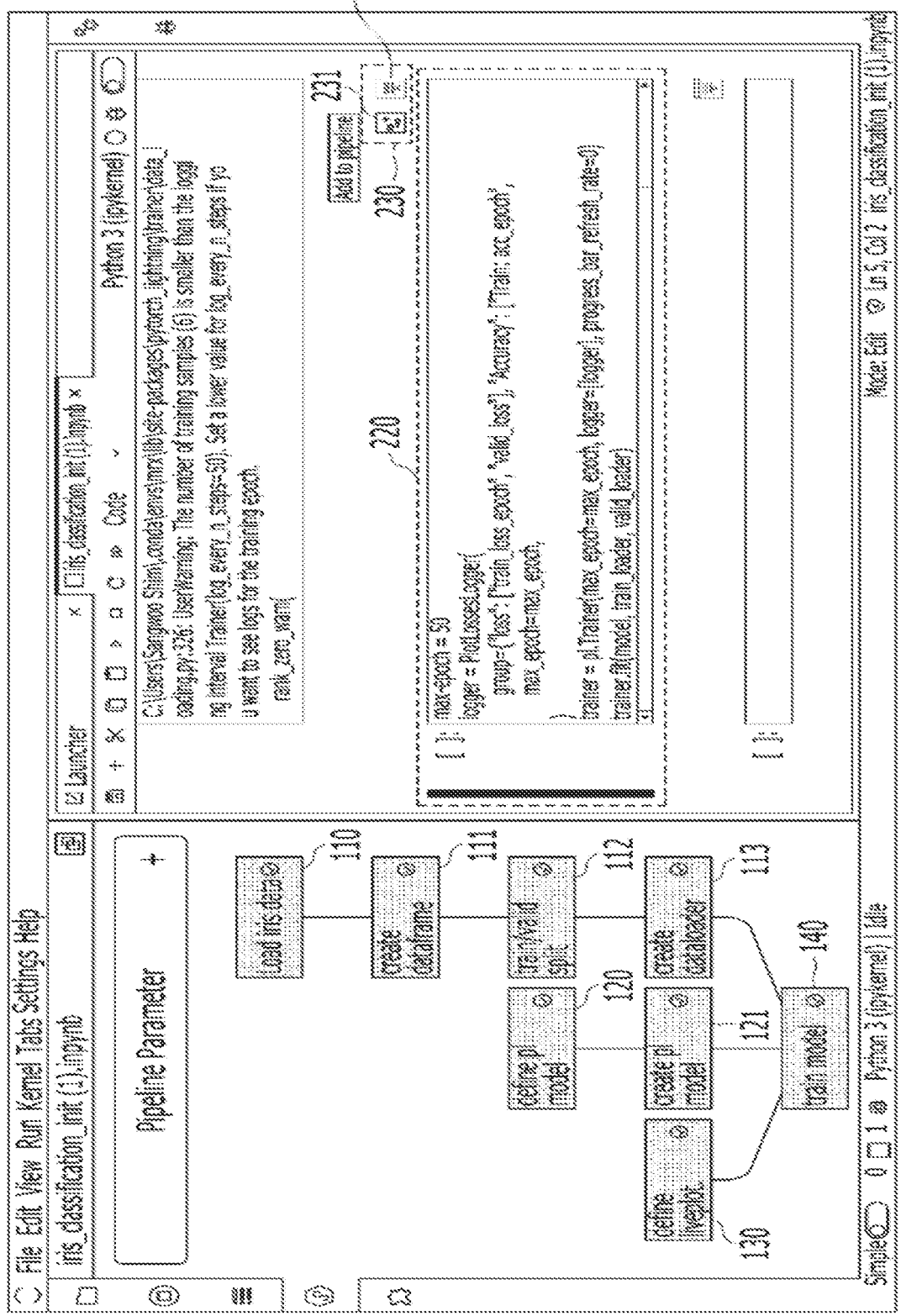
FIGS. 14A to 14E are conceptual diagrams of an interface for adding a specific code block and a pipeline corresponding to the specific code block to an execution target block and executing the code block by utilizing cache data according to the exemplary embodiment of the present disclosure.
Figure 14B:
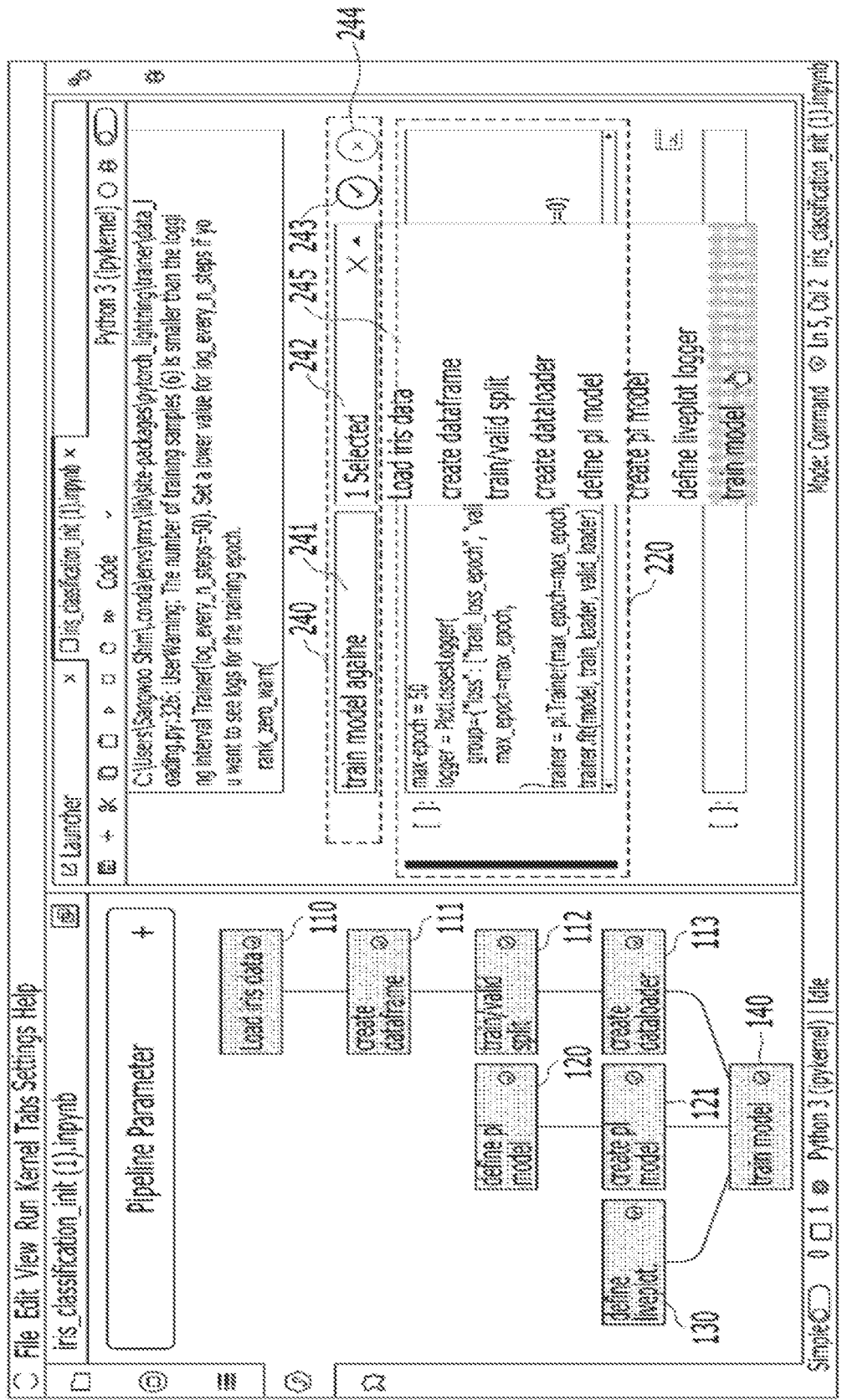
Figure 14C:
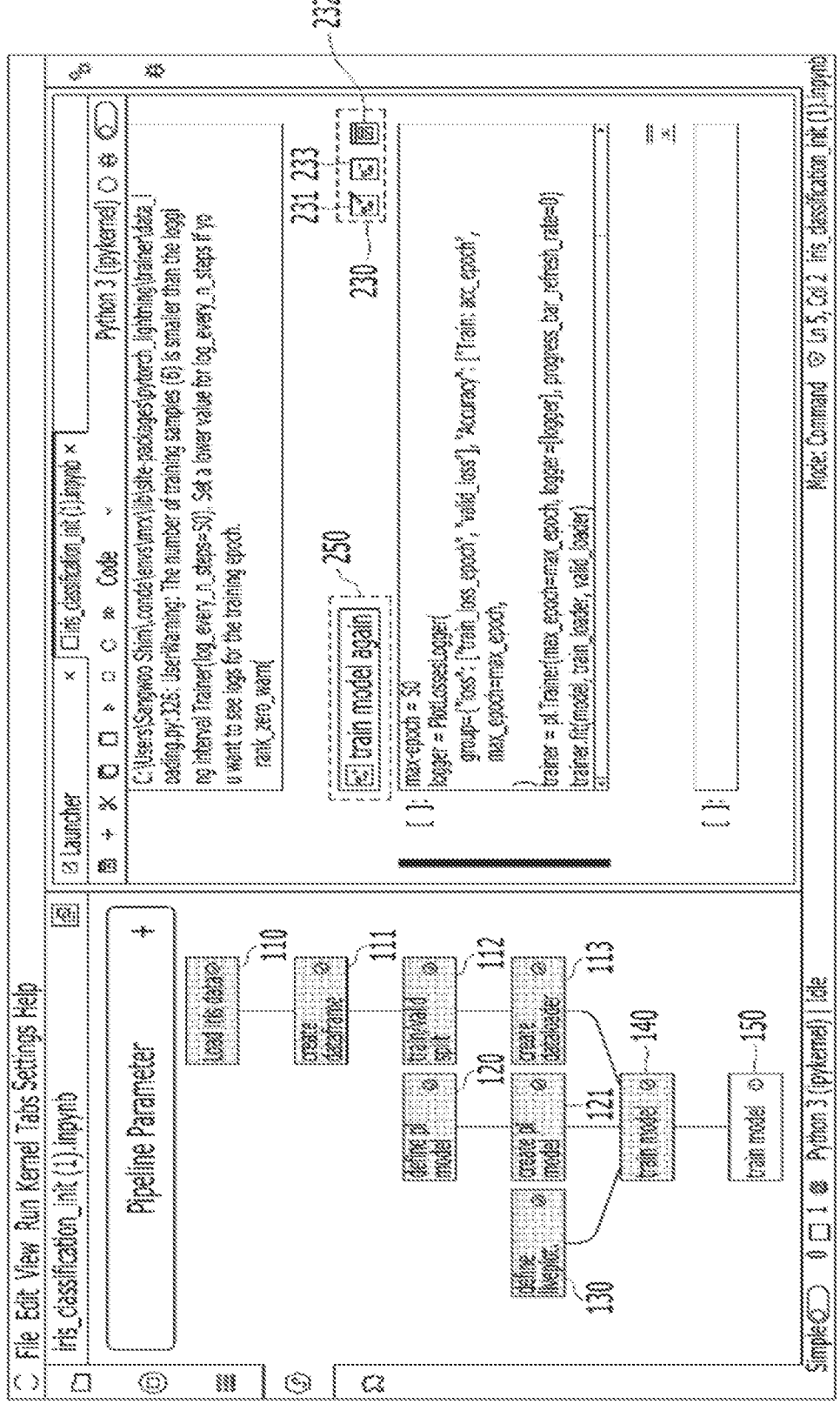
Figure 14D:
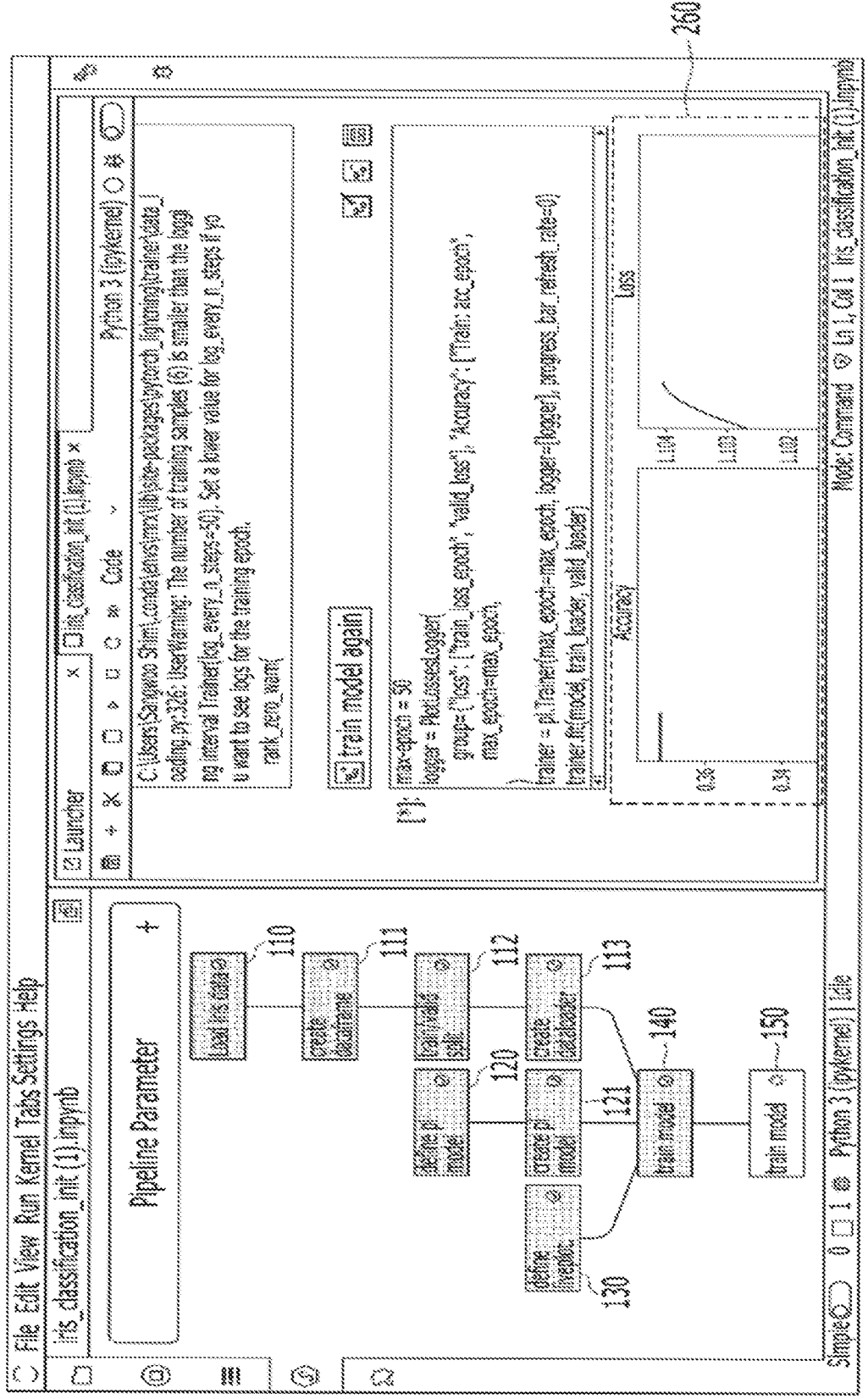
Figure 14E:
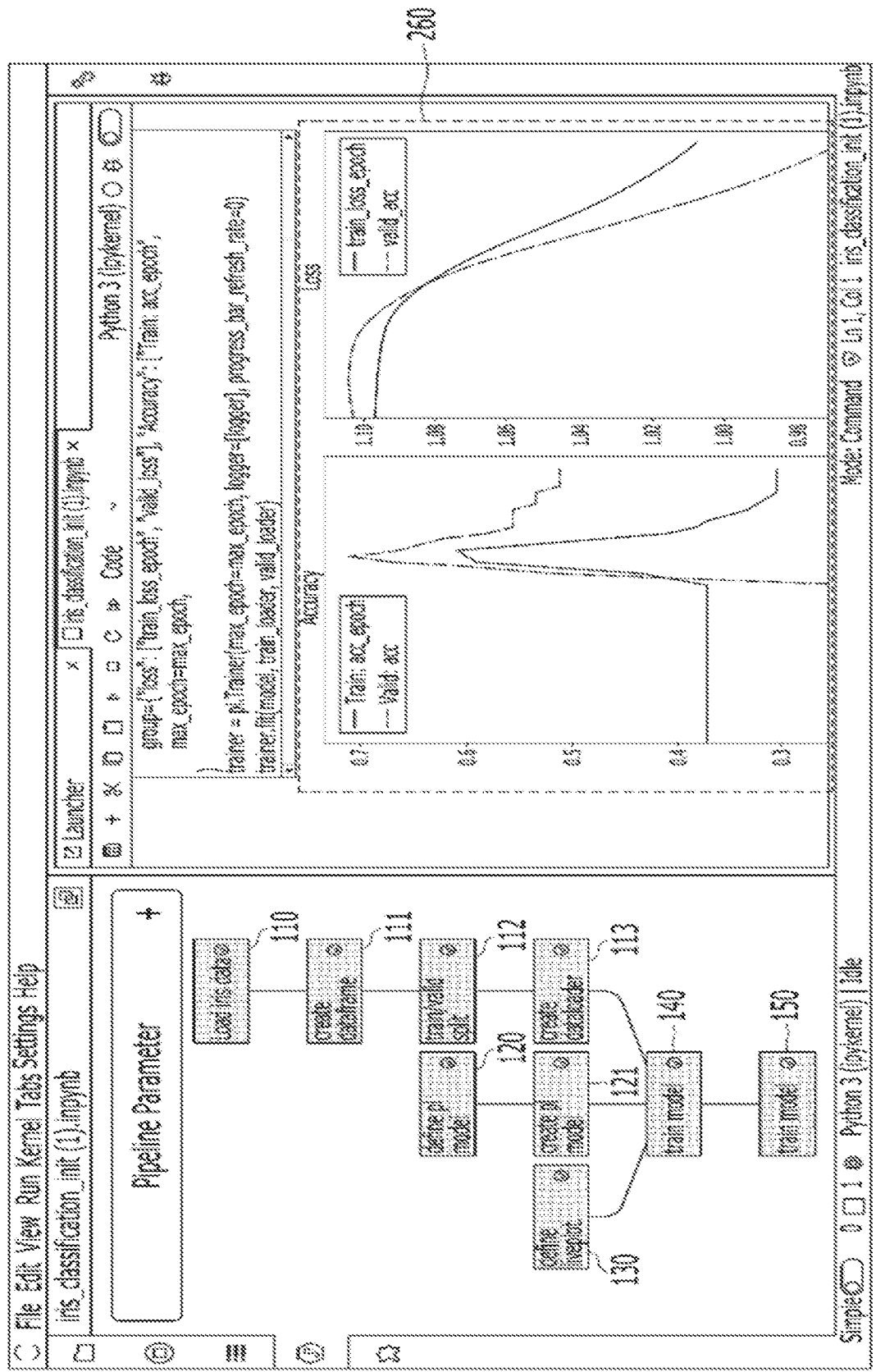

According to the exemplary embodiment of the present disclosure, data obtained by executing at least some of the execution target blocks may be utilized in the execution process of the newly added execution target block. Referring to FIG. 14C, the train model block 140 has already been executed completely and remains in the form of cache data, and then a new code block 'train model again' block 150 may be added as an execution target code. In this case, in order to execute the 'train model again' block 150, the execution result of the 'train model' block 140, which has already been executed completely and stored in the form of cache data, is used instead of the execution of all execution target blocks connected sequentially.

According to the existing method that does not utilize cache data in the above example, a total of 9 execution target blocks needs be executed to obtain the result, but according to the present disclosure in which it is possible to perform partial execution of code blocks and utilize stored cache data, only a total of three execution target blocks may be executed to derive a final result. Due to the above characteristics of the present disclosure, time and computing resources required for a user to derive a result value of a code block may be significantly saved.

Meanwhile, the cache data generated by executing some of the execution target blocks may be data loaded from the outside rather than executed in the processor 110. For example, in the case of (d) of FIG. 13, the result of each of the 'define Liveplot' block 130, the 'define pI model' block 120, the 'create pI model' block 121, the 'load iris data' block 110, the 'create dataframe' block 111, the 'train/valid split' block 112, and the 'create dataloader' block 113 is not obtained by the direct execution of the processor 110, but may be data loaded from the outside by the operation in (c) of FIG. 13.

The present disclosure may include an operation of exporting the cache data and the pipeline structure generated by executing at least some of the execution target blocks by the processor 110 in a form usable by another computer program. For example, referring to (a) of FIG. 13, the 'define Liveplot' block 130, the 'Load iris data' block 110, the 'create dataframe' block 111, the 'train/valid split' block 112, the 'create dataloader' block 113, and the 'define pI model' block 120, and one or more pipelines defining the relationship between the blocks may be exported by a specific input to the outside.

According to the exemplary embodiment of the present disclosure, the plurality of execution target blocks and one or more pipelines are exported in a form suitable for application to a larger-scale technology, such as a Machine Learning Model Operationalization Management (MLOps) platform, thereby contributing to the efficient operation of the corresponding platform.

The above method may include a method executed by the processor 110 based on the data stored in the memory 130 of the computing device 100, a method executed by the processor 110 based on the data received by the network unit 150 from a server outside the computing device 100, or a method in which the network unit 150 receives the result by a cloud computing and the processor 110 displays the received result, but the present disclosure is not limited thereto.

Meanwhile, an interface for executing the above method in a computing device is disclosed with reference to the drawings. FIGS. 2 to 14*e* are conceptual diagrams of an interface for providing a development environment according to an exemplary embodiment of the present disclosure. The interface includes a first area 100 displaying schematic diagrams of execution target blocks and a second area 200 displaying code blocks, and a plurality of code blocks may be displayed in the second area.

Figure 5:
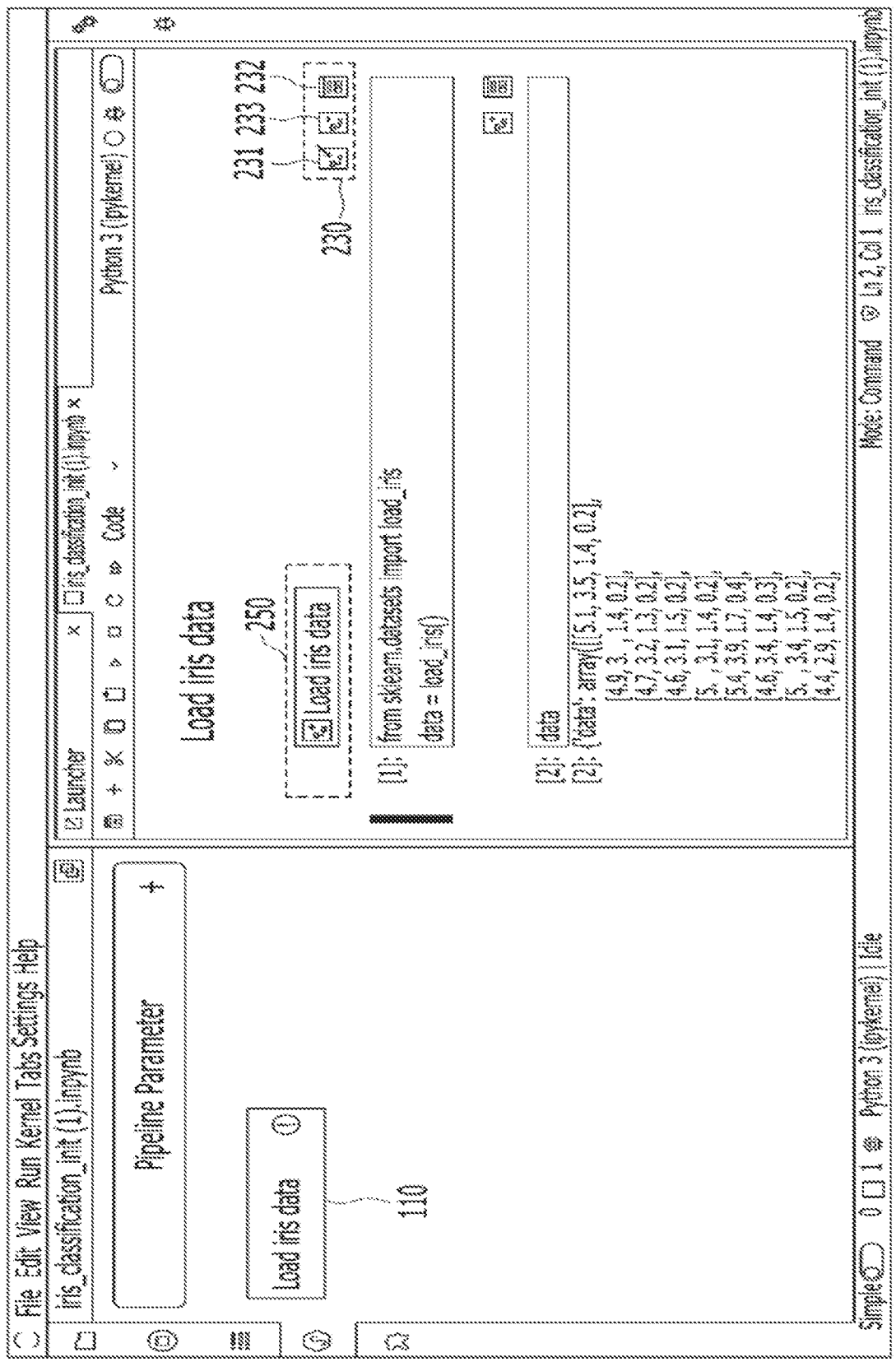
FIG. 5 is a conceptual diagram of an interface for displaying a schematic diagram of an execution target block according to the exemplary embodiment of the present disclosure.
Figure 6:
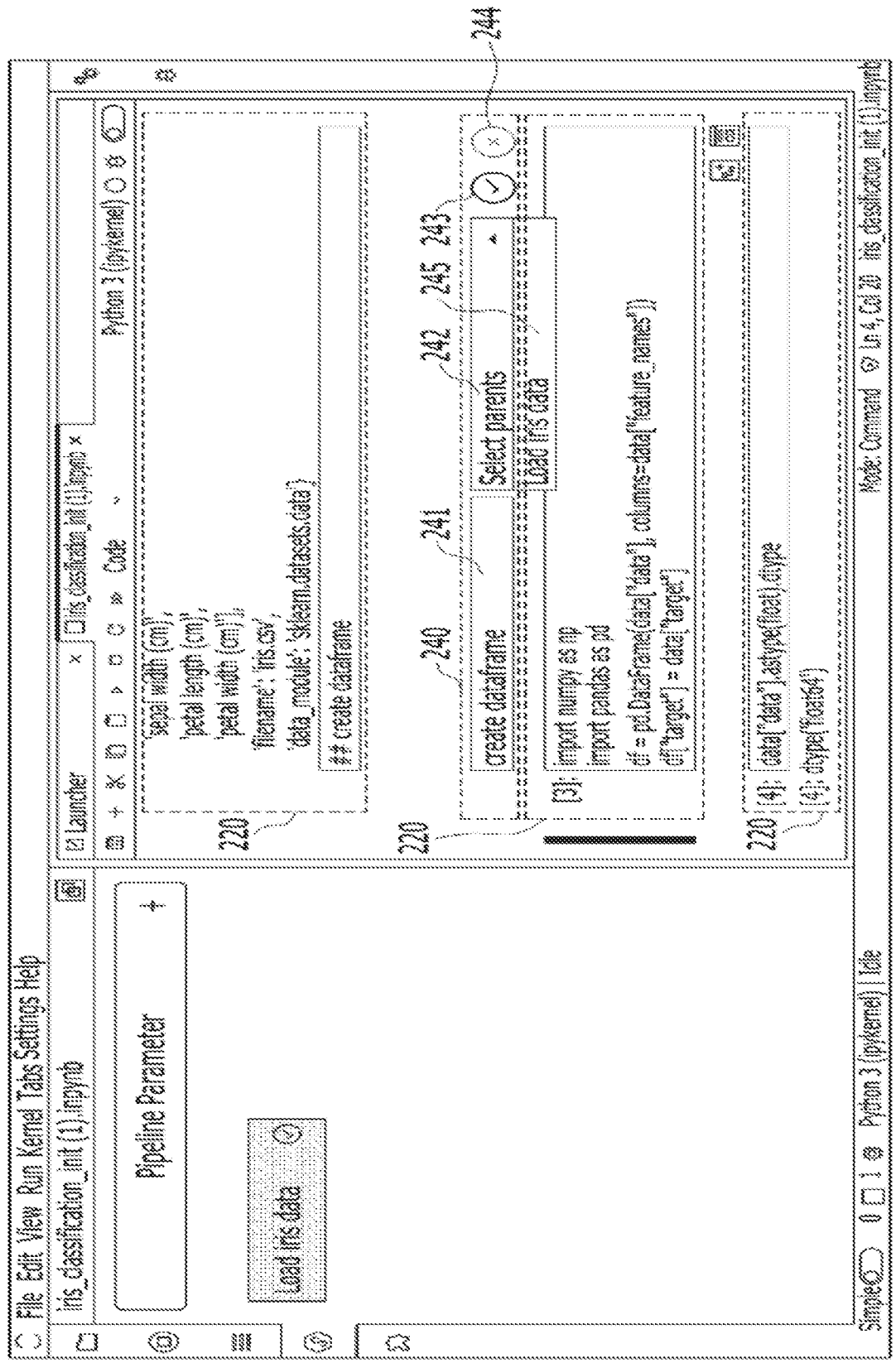
FIG. 6 is a conceptual diagram of an interface for defining properties of a pipeline and connecting an execution target block according to the exemplary embodiment of the present disclosure.
Figure 7:
FIG. 7 is a conceptual diagram of an interface for adding an execution target block according to the exemplary embodiment of the present disclosure.

Meanwhile, the interface may include an interface 250 displaying a name of a specific code block as illustrated in FIG. 5.

The interface may include an interface 231 for adding a specific code block among the plurality of code blocks to an execution target block and an interface 232 for removing the specific code block from the execution target block.

Meanwhile, referring to FIG. 3, the interface may include a menu interface 241 for searching for a specific code block among the plurality of code blocks displayed on the second area 200, and a menu interface 242 for displaying a search field and receiving input defining properties of the pipeline from the search field.

The interface may include a function of connecting one code block with a plurality of execution target blocks. For example, referring to FIG. 8, a code block named 'train model' may be searched from the menu 241, and be designated to be combined with three execution target blocks named 'create dataloader', 'create pI model', and 'define Liveplot logger' with a pipeline.

The interface may include an interface displaying which block among the execution target blocks displayed on the first area 100 corresponds to the specific code block selected by the user in the second area 200, and an interface for displaying, on the first area 100, contents corresponding to a specific execution target block selected by the user in the second area 200.

Meanwhile, the interface 243 for displaying the execution target block and the pipeline in the first area may display the execution target block and the pipeline in the first area according to a user's input, and the interface 244 for canceling a task may cancel the task of adding the execution target block and the pipeline according to a user's input.

Meanwhile, the execution target block and the pipeline may be displayed in the form of an abstracted schematic diagram 110 on the first area 100 by the interface 243 displaying the execution target block and the pipeline in the first area.

Meanwhile, the interface may display an execution order of execution target blocks and execution status according to a user's input. For example, in response to the user's input to execute the execution target block 140 of the final stage, the execution target blocks 130, 113, 121, 110, 111, 112, and 120 having relevancy with the execution target block 140 of the final stage are all executed sequentially in the interface. During this process, the interface may display the execution order of the plurality of execution target blocks and whether or not the plurality of execution target blocks have been executed completely.

On the other hand, the method for distinguishing the execution target blocks 110, 111, 112, 113, 120, and 130 that have been executed completely and the execution target blocks 121 and 140 that have not completed execution may be the method of differently specifying brightness, saturation, color, and shape, but the present disclosure is not limited to this.

Meanwhile, the interface may include an interface for displaying a code block that has been executed completely. For example, the execution target blocks 110, 111, 112, 113, 120, and 130 that have been executed completely may store result values in the form of cache data even when the execution is completed. The interface representing the execution target block whose result value is stored in the form of cache data may include an interface in which brightness, saturation, shade, color, and shape are depicted in a different way so that the execution target block is distinguished from an execution target block that has not yet been executed, or an interface, such as a checkbox that provides the user with an indication of whether or not the execution target blocks have been executed.

Meanwhile, the interface may include an interface for displaying whether the cache data is stored, an execution order of at least some of the execution target blocks, and whether or not the execution target block is executed when the data stored in the form of cache data is used. For example, the interface may display that the results of the execution target blocks 110, 111, 112, 113, 120, and 130, which have been executed completely, have been stored in the form of cache data, as illustrated in FIG. 14A, and display a process in which the execution target blocks are sequentially executed and whether or not the cache data is reused and executed without executing all execution target blocks when the contents of the block 121 or 140 are modified and recalculated.

On the other hand, the user may export the results stored in the form of cache data after execution is completed from the menu 190, or the user may export a plurality of execution target blocks and one or more pipelines from the menu 190 for use in other programs. Meanwhile, the user may call external data and designate the external data as cache data of the plurality of execution target blocks, as illustrated in FIG. 14C.

FIGS. 14A to 14E are conceptual diagrams of the interface for adding a specific code block and a pipeline corresponding to the specific code block to an execution target block and executing the code block by utilizing cache data according to the exemplary embodiment of the present disclosure. For example, a new code block 150 connected to an execution target block may be added by a user's input. When a user wants to execute a new code block 150, the data of the execution target blocks 110, 111, 112, 113, 120, 121, 130, and 140, which have been previously executed and the results of the execution are stored in the form of cache data, are reused, and a final result 260 may be derived and displayed without re-executing all connected execution target blocks.

Meanwhile, according to an exemplary embodiment of the present disclosure, a computer-readable medium storing a data structure related to a development environment and an interface implementing the development environment is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Figure 15:
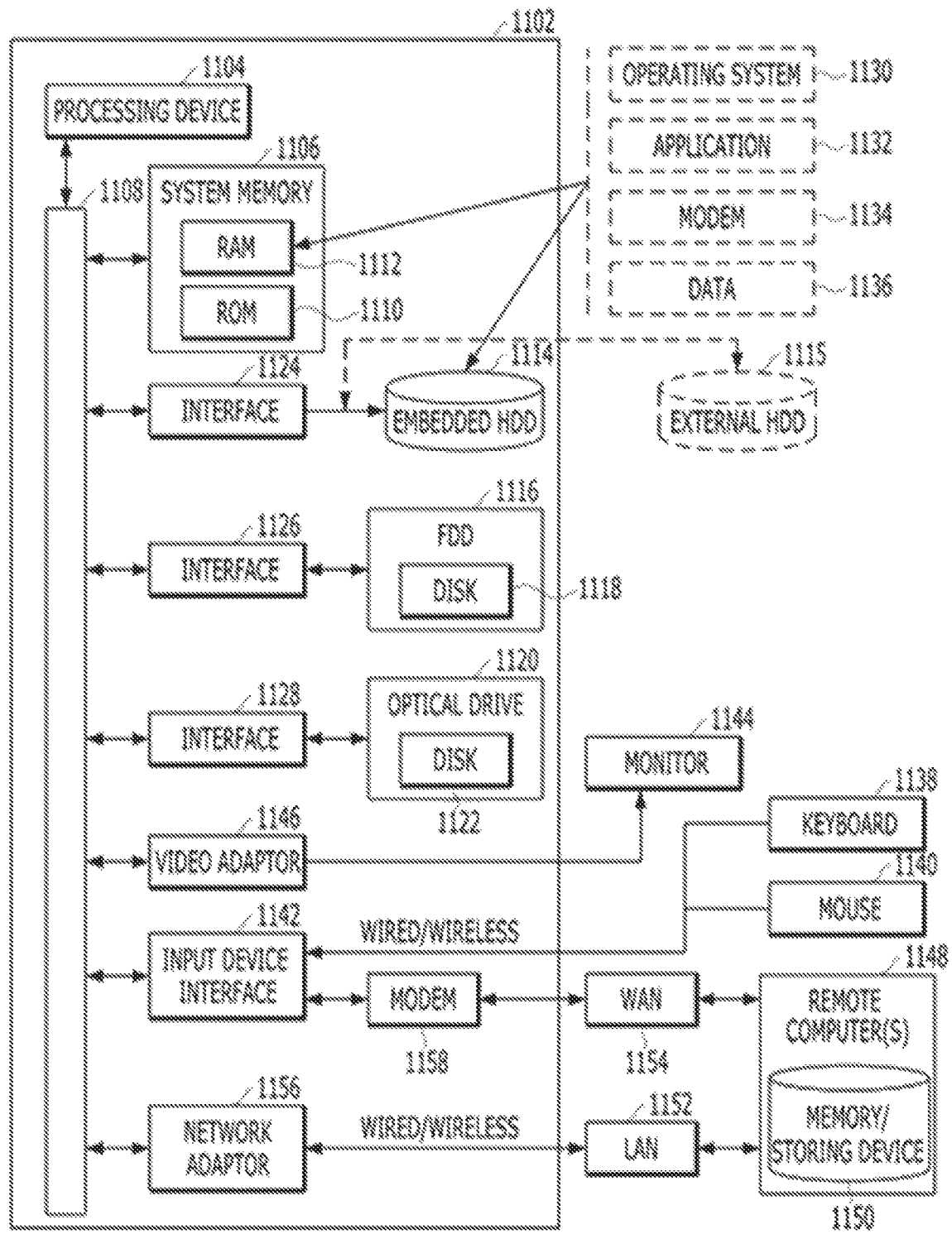
FIG. 15 is a block diagram of a computing device according to the exemplary embodiment of the present disclosure.

FIG. 15 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method performed by a computing device for implementing a Graphical User Interface (GUI) providing a development environment, the method comprising:
    setting a plurality of code blocks;
    designating two or more execution target blocks among the plurality of code blocks;
    constructing one or more pipelines defining a relationship between the two or more execution target blocks and connecting the two or more execution target blocks;
    executing at least some of the two or more execution target blocks based on connection relationship of the one or more pipelines; and
    wherein the executing of at least some of the two or more execution target blocks based on the connection relationship of the one or more pipelines includes i) reusing and executing execution data for at least some of the two or more execution target blocks when cache data is utilized in an execution process; and ii) executing only at least some of the execution target blocks when the cache data is not utilized in the execution process.

2. The method of claim 1, wherein the setting of the plurality of code blocks includes:
    searching for execution target blocks among the plurality of code blocks; and
    designating the execution target blocks from a result of the search.

3. The method of claim 1, wherein the constructing of one or more pipelines defining the relationship between the two or more execution target blocks and connecting the two or more execution target blocks includes:
    searching for connection target blocks among the two or more execution target code blocks;
    selecting a pipeline defining a relationship between the connection target blocks; and
    combining the connection target blocks with the selected pipeline.

4. The method of claim 1, wherein the executing of at least some of the two or more execution target blocks based on the connection relationship of the one or more pipelines includes:
    selecting at least one block from among the two or more execution target blocks; and executing the at least one selected block and one or more execution target blocks connected to the at least one selected block in a dependency relationship together.

5. The method of claim 1, wherein the cache data is data in which some of the execution target blocks are executed and a result of the execution is stored in a cache form.

6. The method of claim 1, further comprising:
exporting the two or more execution target blocks connected by the one or more pipelines into a form usable by another computer program.

7. A computing device, comprising:
a processor including one or more processing cores;
one or more non-transitory memories; and
wherein the processor is configured to execute instructions stored in the one or more non-transitory memories to perform operations for implementing a Graphical User Interface (GUI) providing a development environment, the operations comprising
  1) Setting a plurality of code blocks;
  2) Designating two or more execution target blocks among the plurality of code blocks;
  3) Constructing one or more pipelines defining a relationship between the two or more execution target blocks and connecting the two or more execution target blocks; and
  4) Executing at least some of the two or more execution target blocks based on connection relationship of the one or more pipelines, and
where the graphic user interface includes
  i) an interface for receiving a user's third input for selecting at least one block to be executed from among the two or more execution target blocks;
  ii) an interface for receiving a fourth input for selecting a block in which cache data is stored when there is the cache data to be used for calculating the at least one block to be executed; and
  iii) an interface for displaying a result of calculating the at least one execution target block by using the cache data in response to the third input or the fourth input.

8. The computing device of claim 7, wherein the graphic user interface further includes:
a first area displaying schematic diagrams of the two or more execution target blocks connected by the one or more pipelines;
a second area displaying the plurality of code blocks;
a third area displaying properties of the two or more execution target blocks and the one or more pipelines; and
a fourth area displaying a result of executing at least some of the execution target blocks.

9. The computing device of claim 8, wherein the graphic user interface includes:
an interface for receiving a first input for designating at least one execution target block from a search field;
an interface for searching for and displaying the at least one execution target block in response to the first input;
an interface for receiving a second input defining properties of the pipeline from the search field; and
an interface for configuring the at least one execution target block into a pipeline and displaying the configuration in response to the first input and the second input.

10. The computing device of claim 9, wherein the graphic user interface further includes:
an interface for displaying whether a corresponding code block is included in the execution target block; and
an interface for displaying contents of the corresponding code block.

11. The computing device of claim 8, wherein the graphical user interface (GUI) further includes an interface for displaying whether the result of executing each block is stored in a cache form.

12. A computer program stored in a non-transitory computer-readable storage medium, where the computer program is configured to perform operations for implementing a Graphical User Interface (GUI) that provides a development environment when being executed in by one or more processors, where the operations comprising:
setting a plurality of code blocks;
designating two or more execution target blocks among the plurality of code blocks;
constructing one or more pipelines defining a relationship between the two or more execution target blocks and connecting the two or more execution target blocks; and
executing at least some of the two or more execution target blocks based on connection relationship of the one or more pipelines, and
wherein the executing of at least some of the two or more execution target blocks based on the connection relationship of the one or more pipelines includes:
reusing and executing execution data for at least some of the two or more execution target blocks when cache data is utilized in an execution process; and
executing at least some of the execution target blocks when the cache data is not utilized in the execution process.

* * * * *